United States Patent Office 3,493,758
Patented Feb. 3, 1970

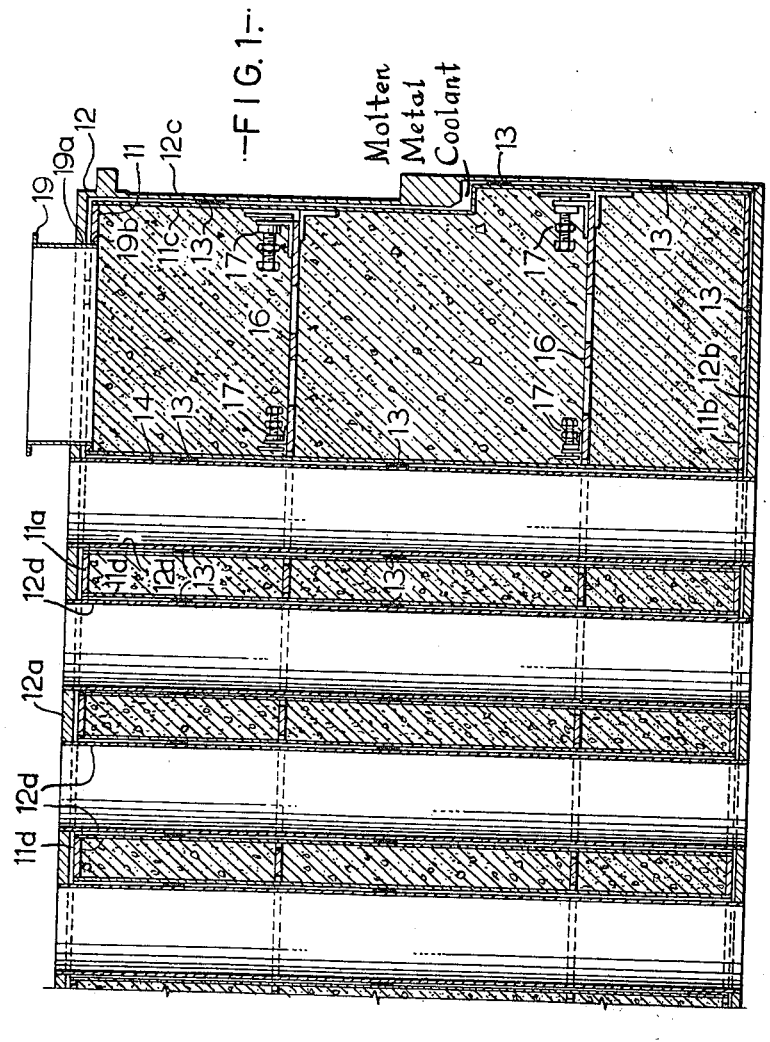

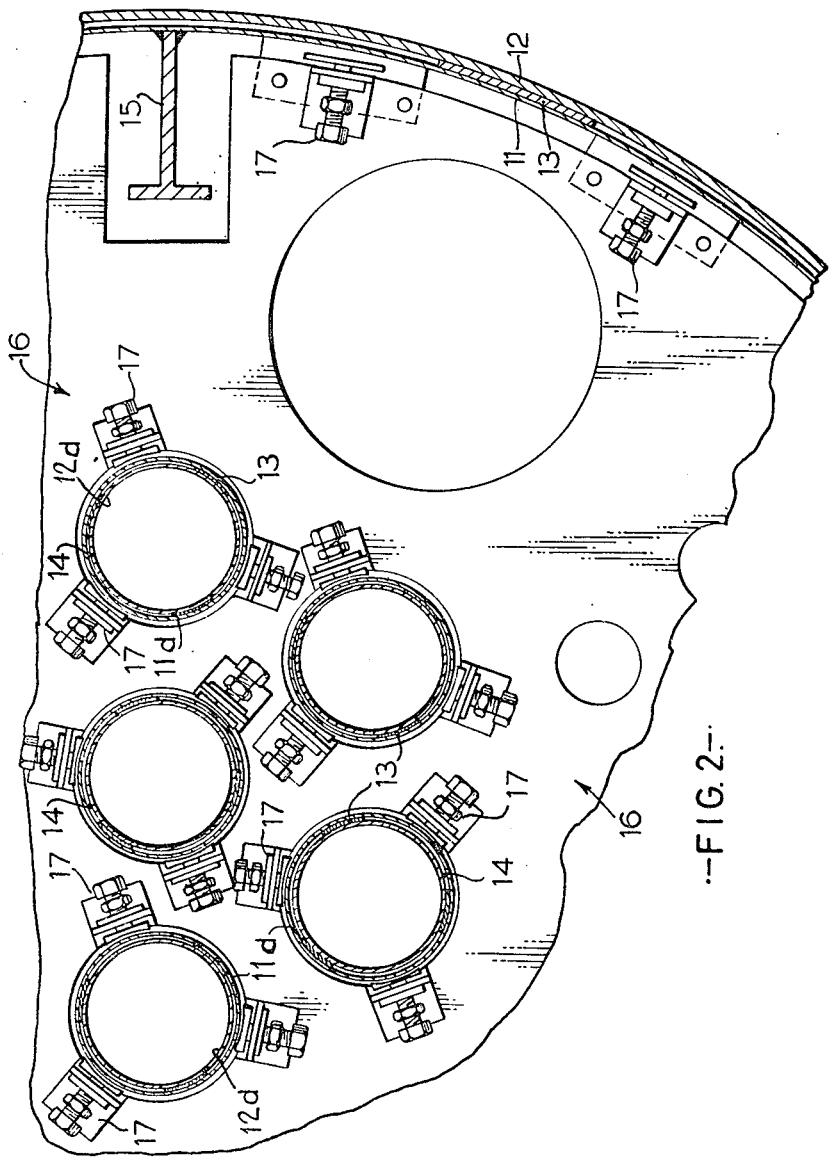

3,493,758
RADIATION SHIELDING AND COOLING FOR NUCLEAR REACTOR UTILIZING MOLTEN METAL
Horace Frank Parker, Culcheth, and John Webb, Bryn, near Wigan, England, assignors to United Kingdom Atomic Energy Authority, London, England
Filed May 2, 1966, Ser. No. 546,906
Claims priority, application Great Britain, May 11, 1965, 19,914/65
Int. Cl. G21f 3/00; G21h 5/00
U.S. Cl. 250—108   5 Claims

ABSTRACT OF THE DISCLOSURE

Radiation shielding, suitable for use in nuclear reactor environments, in which one face of the shielding is exposed to a hotter environment than another face, has such faces constituted by hollow walls which are filled by a metal which remains molten in service, the hollow interiors of the hollow walls being interconnected to permit a naturel convection closed circulation of the molten metal for reducing the temperature differential of said faces. The shielding can have penetrations, for example for control mechanisms.

---

The present invention relates to radiation shielding which is to be understood herein to mean shielding against ionising radiations. More particularly the invention concerns shielding which is exposed in service to heat as well as ionising radiations; this is usual for the shielding employed in nuclear reactor plant.

Concrete is a favoured shielding material but large thicknesses are generally necessary and the thermal conductivity is poor. To avoid steep temperature gradients, the present practice is to provide the concrete with a forced circulation cooling arrangement. An aim of the invention is to provide a shielding cooling arrangement which is more simple.

According to the invention, radiation shielding for service with one face exposed to a hotter environment than another face has these faces formed by hollow walls which are filled with a metal having a melting point low enough to be molten in service and of which the hollow interiors are interconnected so that a natural convection circulation of the metal between the faces can occur in order to reduce the temperature differential of these faces. Suitable metals are the low melting point alkali metals and their alloys, e.g. the sodium potassium alloy known as NaK.

Apart from the need of cooling for the prevention of thermally induced deterioration of the shielding material it may also be needed to counter thermally induced dimensional changes, as where there are penetrations through the shielding which could suffer significant alteration of course as a result of a large temperature gradient. Thus, in accordance with the invention, radiation shielding with penetrations extending between opposite faces which in service are exposed to environments at different temperatures has these opposite faces formed by hollow walls as above set forth, the natural convection circulation of the metal being then also effective to reduce thermally induced distortion of the penetrations.

Penetrations as previously referred to may serve for control mechanisms by which a nuclear reactor core is controlled or shut down. For the proper functioning of these mechanisms it can be of the utmost importance that the penetrations remain undistorted during operation of the core. In a more specific form of the invention, nuclear reactor radiation shielding with penetrations for control mechanisms extending between inner and outer faces comprises jacketting over substantially all of the peripheral surface, including that of the penetrations, such as to provide jacket space common to both faces, and the jacket space being filled with a metal having a melting point low enough to be molten during service of the shielding with the reactor in operation so that a natural convection circulation of the metal occurs. Such shielding may constitute a closure for a vessel housing the reactor core, e.g. the component known as the top shield plug for a liquid metal cooled fast reactor core housed in a tank. In this example, a construction is envisaged in which the convection circulation proceeds up the jacket space of the penetrations and down the jacket space of the side walls.

Thermal insulation may be provided on the hotter face; for the fast reactor top shield such insulation may be a structure of metallic plates. An expansion tank for the circulating metal may also be provided.

The simplification compared with previous shielding arrangements is that circulation forcing fans or pumps, and separate heat exchanger apparatus, can be dispensed with. In the case of the fast reactor top shield with the outer face exposed to the air conditions of a ventilated building the temperature difference between the circulating metal at the inner and outer faces can be held to within 5° C.

The application of the invention to a rotating shield of a metal cooled fast nuclear reactor will now be described by way of example with reference to the accompanying drawings of which:

FIGURE 1 is a detail elevational section of a rotating shield, and

FIGURE 2 is a detail horizontal section of a rotating shield.

Some nuclear reactors have an arrangement known as a rotating shield to minimise on the number of accesses required to refuel and control the nuclear core. British patent specification 985,463 mentions one type wherein the top shield comprises two parts, an outer rotatable part and an eccentric inner rotatable part with a penetration for refuelling the reactor whereby suitable rotations of the two parts would align the penetration with any desired fuel position. In another type the top shield is in one rotatable piece, the place of the inner rotatable part being taken by a rotatable pantagraph structure eccentrically supported from the top shield which structure could be used to move fuel into or from the core through a fuel transfer port.

British Patent No. 985,463 did not specifically point out that the top shield had further penetrations for reactor control but this is obvious to one skilled in the art. It should perhaps be explained that these control rods are lowered into the core and released from the top shield before the shield is rotated.

The present drawings show what a top shield would really look like, a round thick slab of material with a large number of through penetrations. Although the drawings show a one piece rotatable shield the invention is applicable to all shielding and to top shields whether rotatable or not and in however many pieces.

Essentially, the drawings show two calandria-type vessels one within the other, the inner vessel 11 being located within the outer vessel 12 by pads 13, so as to define a completely double walled vessel with a coolant space 14 between the walls. A calandria vessel for example vessel 11 consists of circular top and bottom plates 11a and 11b respectively, an outer skirt 11c and a plurality of tubes 11d, the ends of the skirt and the tubes being sealed to the top and bottom plates.

The inner calandria type vessel 11 is filled with concrete and the coolant space with a low melting point metallic coolant. The walls of the inner vessel 11 are buttressed by stiffening ribs 15 and braced by means of transverse plates 16. These plates are equipped with adjustable screw type jacks 17 which engage the skirt and the tubes to compensate for any distortion.

The jacks 17 are spaced from the pads 13 both axially and circumferentially so that the pads will be able to give slightly.

To assemble the top shield, the inner vessel is welded together and the tubes 12d and the base plate 12b of the outer vessel are also welded together. The inner vessel 11 is then forcibly lowered over the tubes 12d. Then the skirt 12c of the outer vessel is forcibly lowered over the inner vessel 11, the top plate 12a of the outer vessel being welded to the skirt 12c before or after this lowering operation and finally all non-performed welds are carried out. The top shield is then put into position within a reactor and concrete poured into the inner vessel and allowed to set, and finally the metallic coolant is introduced into the space 14. A manhole 19 used to pour the concrete is provided by a duct inserted through aligned holes 19a and 19b in the outer vessel and the inner vessel which duct is sealed to both vessels desirably after all the other welding has been completed a sealable inlet means, complete with an expansion space, is provided for the introduction of the metallic coolant into the space between the two vessels.

What we claim is:

1. For a nuclear reactor, a radiation shield for service with its inner face exposed to the hot environment of the reactor core and its outer, opposed, face exposed to a cooler environment, comprising a structure formed with double walls, the outer of the double walls constituting said faces, the spaces between said walls being occupied by a metal having a melting point low enough to be molten when the reactor is in service, interconnection between said spaces for permitting natural convection closed circulation of molten metal for reducing the temperature differential of said faces, and radiation shielding material located between the inner of said double walls.

2. A radiation shield according to claim 1 wherein the metal is selected from the group consisting of low melting point alkali metals and their alloys.

3. Nuclear reactor radiation shielding in substantially cylindrical form and with penetrations for control mechanisms extending between inner and outer end faces thereof, comprising jacketing over substantially all peripheral surfaces, including those of the penetrations, such as to provide jacket space common to both end faces, and the jacket space being closed and substantially filled with a metal having a melting point low enough to be molten during service of the shielding with the reactor in operation.

4. Radiation shielding according to claim 1 having penetrations extending between said faces, said natural convection closed circulation of the molten metal being then also effective to reduce thermally induced distortion of the penetrations.

5. Radiation shielding according to claim 4 wherein the penetrations serve for control mechanisms by which a nuclear reactor core is controlled or shut down.

References Cited

FOREIGN PATENTS 1,146,209  3/1963  Germany.

ARCHIE R. BORCHELT, Primary Examiner

U.S. Cl. X.R.

176—64; 250—106